Jan. 22, 1952  H. W. NIEMAN ET AL  2,583,438
METHOD AND APPARATUS FOR ELIMINATING IMPURITIES FROM
METALS WHICH ARE IN A FLUID STATE
Filed Sept. 5, 1947  2 SHEETS—SHEET 1
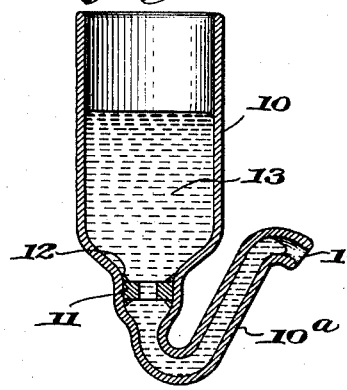
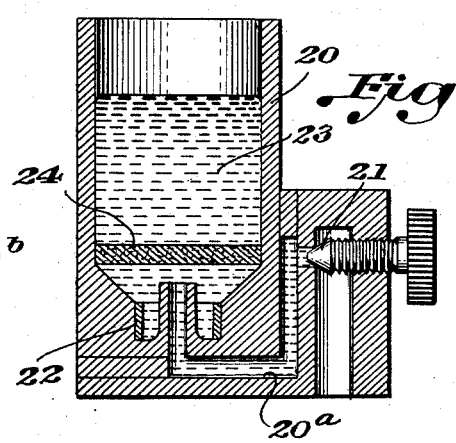
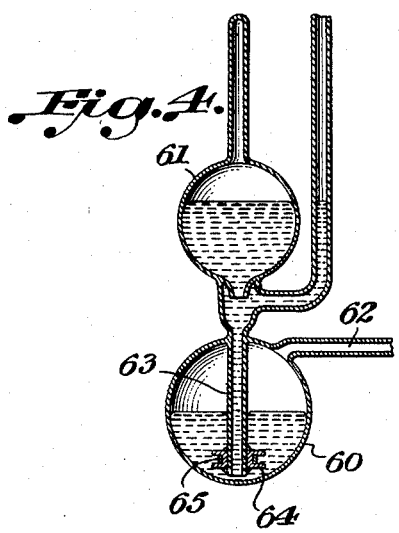
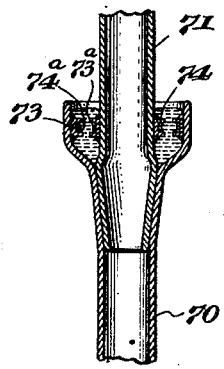
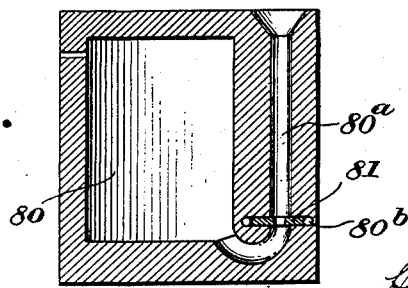

Patented Jan. 22, 1952

2,583,438

UNITED STATES PATENT OFFICE 2,583,438

METHOD AND APPARATUS FOR ELIMINATING IMPURITIES FROM METALS WHICH ARE IN A FLUID STATE

Henry W. Nieman and Chauncy W. Nieman, Bethlehem, Pa.

Application September 5, 1947, Serial No. 772,418

7 Claims. (Cl. 210—1)

This invention relates to a method of and apparatus for eliminating impurities from metals which are in a fluid state.

A metal which is in fluid condition may contain dissolved impurities, or impurities in solution, and impurities may likewise be distributed over its surface. It may be desired to remove both the dissolved impurities and the surface impurities or it may only be necessary to remove the surface impurities in order to render the metal entirely suitable for use. These impurities may be of numerous types including water, oil, oxides, acids, and others. The present invention provides an improved apparatus for and method of eliminating surface impurities from fluid metal and, if desired, the dissolved impurities as well as the surface impurities.

To remove the surface impurities contact is established between the body of fluid metal to be cleaned and a member which is wetted by that metal so that a seal between metal and member is established. Relative movement of the member and metal body is then effected. No surface impurities may pass the seal thus established and if, as can be done more conveniently, the metal is caused to flow past a sealing member which is stationary, the seal or barrier intercepts surface impurities and prevents them from moving with the metal body upon the surface of which they are gathered. As a result the surface of the body of metal which has passed the sealing member will be entirely free of impurities.

If complete purification of the body of fluid metal is essential the impurities dissolved therein may be caused to separate out and collect upon the surface of such body by subjecting that body to a preliminary purifying operation. When the surface is subsequently rendered clean the metal will have been freed of all contaminating substances. Numerous kinds of metal may be subjected to the improved method of eliminating impurities, including metals such as mercury which are fluid at normal temperatures and metals which are fluid only at elevated temperatures, that is metals such as iron and steel which are fluid only when in molten condition.

The improved method is particularly useful in the purification of mercury. Mercury is, of course, fluid at normal temperatures. In many of its uses it is required to be practically free of impurities, since even minor traces of impurities render it unfit to be used. Numerous methods for the purification of this metal have heretofore been suggested and certain of them actually employed, for instance the method involving the step of vacuum distillation; the method of treatment with gases by causing air, oxygen or other gas to bubble through the mercury for long periods of time; the cleaning of a body of mercury with nitric acid by passing the mercury in fine droplets through a tall vessel filled with dilute nitric acid or other reagents. Surface impurities have frequently been removed by squeezing the mercury through a chamois skin or by allowing the mercury to trickle through a small hole at the bottom of a cone of filter paper. Other methods for the removal of impurities from a body of mercury and for the removal of impurities from the surface of such a body have been resorted to but no one of these methods is free of objection and some may be practiced only with the aid of extensive equipment and are relatively costly.

In accordance with the present invention fluid metals may be purified and cleansed most rapidly and at minimum cost, the necessary apparatus being of greatest simplicity and operable without the aid of skilled attendants. Several forms of apparatus which may be used in the practice of the method will be illustrated and described by way of example, this apparatus being particularly suitable for use in the cleansing and purification of mercury. A modified apparatus for the surface cleansing of molten iron or steel is also illustrated in diagrammatic form. One skilled in the art will appreciate that those forms of apparatus which are thus illustrated and described are set forth by way of example only and that, in carrying out the improved method additional types of apparatus may be utilized.

In the drawings:

Figure 1 shows in section a simple form of apparatus adapted to be utilized in the purification of metals which are fluid at normal temperatures, such as mercury;

Figure 2 is a similar view of an apparatus of this same general type but which includes certain features which render it more effective in use.

Figure 4 is a sectional view through a portion of a vacuum gauge which is provided with means for the surface cleansing of mercury.

Figure 3:
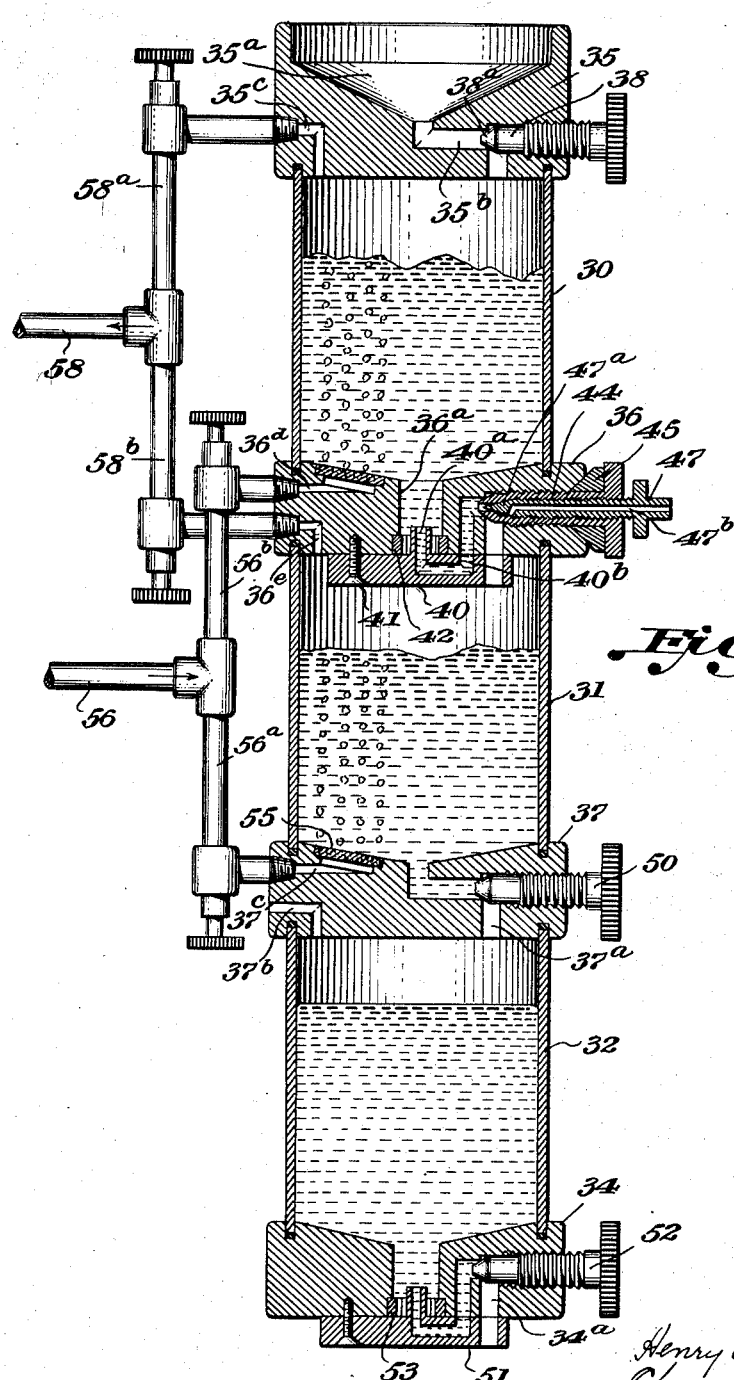
Figure 3 is a vertical section through an apparatus which may be employed commercially for the purification of liquid such as mercury.

Figure 5 is a longitudinal section through portion of a conduit for fluids, taken at a joint between two adjacent members of the conduit and showing associated therewith means for sealing the joint with a body of mercury, the sealing means being equipped with members to prevent penetration of any impurities which may be present upon the surface of the mercury to and through the joint between the mutually facing contacting surfaces of the two members of the conduit, and Figure 6 is a diagrammatic view showing a mold for iron or steel and means associated therewith for preventing the passage of surface impurities into the mold cavity.

The first form of apparatus selected for disclosure by way of example comprises a simple glass receptacle, indicated at 10, having a discharge port in its bottom which opens into an offtake conduit extending through the tubular neck 10a, the offtake conduit terminating in a discharge port 10b. Within the cylindrical reduced neck at the bottom of the vessel 10 is positioned a ring 11, this ring being retained in position by fillets 12 of suitable material. This ring is either of solid gold or a gold alloy, or the surfaces thereof with which mercury may contact are coated with gold, or a gold alloy, or a metal or alloy of a metal other than gold but which may be wetted by mercury. The gold covered surface of the ring 11 bonds with the metal of the mercury 13 within the receptacle 10 and there is thus formed between the body of mercury 13 and the gold covered surface of ring 11 a bond or seal. This seal or bond is continued and maintained so long as mercury remains in the vessel 10 and constitutes a barrier positioned to intercept any impurities upon the surface of the body of mercury which would otherwise pass the ring 11. If the body of mercury within the receptacle remains stationary this seal intercepts and restrains against further movement any such impurities which tend to work downwardly along the vertical inner surfaces of the receptacle and to enter the offtake duct 10a. If the body of metal 13 is allowed to flow through the aperture in the ring 11 the seal between the mercury and the ring will prevent the passage through the aperture in the ring of those impurities which have previously collected upon the surface of the mercury body. Thus the mercury which actually enters the offtake duct 10a is free of surface impurities. It will be appreciated that the level of the upper surface of the mercury in the vessel 10 must not fall below the gold covered surface of the ring 11, otherwise the bond or seal will be broken and a certain quantity of surface impurities will be allowed to enter the duct 10a. As the outlet port 10b is positioned at a higher level than the ring 11 the level of the mercury in receptacle 10 can never fall so low that the seal between mercury and ring is broken.

In the form of the invention shown in Figure 2 the receptacle 20 is provided with an offtake duct 20a and the passage of mercury or other liquid through the offtake duct 20a is controlled by the means of a manually operable valve member 21. The sealing member comprises a cylindrical ring 22 located in a well at the bottom of the receptacle, and below the discharge port of the offtake duct 20a, the inner cylindrical surface of member 22 being preferably gold plated and the member as a whole encircling the upwardly projecting inlet end of duct 20a. It is clear, however, that any surface impurities upon the surface of the body of mercury 23 which work downwardly between the inner wall surface of the vessel 20 and the mercury body will be intercepted by the bond which is formed between the gold surface of the sealing member 22 and the body of mercury, and that these impurities cannot enter the inlet port of the offtake duct 20a. A porous pad 24 disposed horizontally across the mercury receiving space of the vessel 20 just above the inlet port of the offtake duct 20a permits downflow of mercury but maintains the body of mercury below it in quiescent condition even when fresh mercury is poured into the vessel from above. The porous pad, therefore, comprises a guard preventing the direct passage of freshly introduced metal, with its surface impurities, into the inlet port of the offtake duct.

The apparatus shown in Figure 3 is particularly suitable for use in the purification and cleansing of mercury, being provided with means for causing the dissolved impurities in the body of mercury to first collect upon the surface of that body and further means for intercepting the surface impurities which have thus collected. It comprises essentially a column which includes three hollow glass cylinders 30, 31 and 32 respectively, the axes of which are vertically disposed and coincident. The base is indicated at 34, the top at 35 and two intermediate members at 36 and 37 respectively, member 36 being interposed between the cylinders 30 and 31 and member 37 being interposed between the cylinders 31 and 32.

Mercury to be purified is poured into the funnel-like recess 35a in the upper member 35 and flows downwardly through duct 35b into the chamber below, this chamber being defined by the cylinder 30 and the member 36. Flow through duct 35b is controlled by a valve member 38 which has threaded relation with the cylindrical wall of an aperture formed in member 35 and the conical inner end of which, indicated at 38a, is adapted to bear tightly against a valve seat intermediate the ends of duct 35b.

Member 36 is provided with a central vertically extending cylindrical passage 36a, the lower end of which is closed by a disc 40 secured to the flat undersurface of member 36 by suitable securing devices such as screws 41. In an annular recess formed in the wall of the passage 36a at its lower end is an annular ring 42, this ring being maintained in the position in which it is shown by the disc 40 and being removable for inspection, repair or replacement when the disc 40 is removed. Projecting upwardly from the upper surface of disc 40 and disposed axially of the cylindrical recess 36a is a short hollow tubular member 40a which constitutes the inlet end of a tortuous conduit 40b through which fluid may flow downwardly from the chamber above member 36 to the chamber below, duct 40b being formed in part in disc 40 and in part in member 36, as clearly shown. Flow of liquid through this conduit is controlled by a manually operable valve member 44, the conical inner end of which is adapted to engage a conical seating surface which encircles duct 40b. A gasket 45 encircles valve member 44 and prevents leakage of liquid outwardly around the valve member. Preferably the valve member 44 is tubular and its inner surface is threaded to receive threads formed externally upon a rod-like element 47. The inner end of rod-like member 47 is conical and is adapted to seat against a conical surface formed in the bore extending through valve member 44 so as to close this bore against the passage of fluid. By rotating element 47 and unseating its forward conical surface, which is indicated at 47a, fluid is allowed to flow into the interior of valve member 44 from duct 40b and to then enter the duct 47b of member 47 and to pass outwardly to escape from the outer end of that duct and to be collected in a receptacle which may be provided for its reception. By manipulating element 47 from time to time as desired, small quantities of liquid may be allowed to escape from the apparatus. In this manner the purity of the metal may be tested when desired.

Division member 37 is also provided with a duct through which fluid can flow from the chamber above to the chamber below, this duct being indicated at 37a, and flow therethrough being controlled by means of a valve member 50. The bottom member 34 is generally similar to member 36 previously described, having a disc 51 secured to its undersurface and the tortuous outlet channel 34a being formed in part in member 34 and in part in disc 51. Valve member 52 controls the escape of mercury from this bottom chamber or reservoir. The ring 53, with its inner surface covered with gold, encircles the inner end of the outlet duct 34a. The bottom chamber defined by member 34 and the glass cylinder 32 comprises a reservoir for liquid which has been cleansed or cleansed and purified. The upper end of this reservoir is in open communication with the atmosphere at all times through duct 37b formed in member 37, so that liquid may be freely introduced at any time, or freely withdrawn.

Each of the upper two fluid retaining chambers is provided with means for passing a purifying gas through that chamber and through the body of mercury or other fluid contained therein. Thus each chamber has formed in its bottom member an annular recess to receive a porous disc 55, such as a porous stone, and leading to the undersurface of each of these porous stones is a duct for the transmission of gas, one of these ducts being indicated at 37c and the other at 36d. Ducts 37c and 36d are supplied with gas from a gas distributing conduit 56, duct 56 being connected to the ducts or channels first mentioned by branch lines 56a and 56b respectively. Purifying gases passing through the porous blocks 55 will rise vertically and pass through the bodies of mercury above these blocks, the gases collecting in the tops of the two mercury receiving chambers and being withdrawn through ducts 36e and 35c respectively, an offtake main for spent purifying gases being indicated at 58, this main being connected to ducts 35c and 36e by the branch lines 58a and 58b, respectively.

In the operation of the apparatus which has just been described, a quantity of mercury is placed in the upper chamber and is held in that chamber while a purifying gas such as oxygen is passed through it to effect the desired purification. This gas may be varied as desired but if oxygen is used and the rising current is maintained for sufficient length of time the dissolved impurities of the mercury will eventually be caused to separate out and rise to the surface of the body of mercury. Element 47 may be manipulated from time to time to ascertain the degree of purity of the mercury. After the mercury has been sufficiently purified, valve member 44 may be operated so as to permit the outflow of mercury through the duct 40b into the intermediate chamber. The surface impurities are prevented from moving with the body of outflowing mercury by reason of the fact that a bond or seal is formed between the gold upon the surface of ring 42 and the mercury itself so that the mercury which actually escapes through duct 40b will be entirely uncontaminated.

Naturally the level of mercury in the upper chamber should not be allowed to fall below the upper end of the tubular end of duct 40a as otherwise some surface impurities would then pass into the duct 40b and the intermediate chamber. After this outflow of purified mercury, valve member 44 may be operated and duct 40b closed. At this time the valve at the inner end of valve member 50 prevents the outflow of mercury through duct 37a and the body of mercury retained in the intermediate chamber is subjected to further purification. If desired, division member 37 may have associated therewith a band or ring with a gold covered surface to prevent the passage from the intermediate chamber to the reservoir below of any surface impurities which have been developed in the intermediate chamber. This, however, is not necessary in a case where, as here, the lower chamber or reservoir is provided with such a ring, as clearly shown in the drawings. From the lower chamber the cleansed and purified mercury may be withdrawn from time to time as needed, the process being preferably carried out in a continuous manner.

By the use of the apparatus and method thus described mercury may be cleansed and purified to a very high degree of purity and at the smallest possible cost. The gold surfaces of the rings may need to be renewed from time to time, or the rings replaced, but each will endure for a substantial period, deterioration being only gradual and quite slow. Whenever replacement is necessary, however, this can be easily effected.

The device diagrammatically illustrated in Figure 4 is what is known as a McLeod vacuum gauge and it is occasionally necessary in the operation of such a gauge that mercury flow from the lower chamber 60 to the upper chamber 61. Thus air under pressure may be introduced through the duct 62 into the chamber 60 so as to force downwardly the level of the body of mercury contained in chamber 60, this mercury passing upwardly toward chamber 61 through a tube 63. To prevent impurities which have collected upon the outer surface of the body of mercury in chamber 60 from passing upwardly through tube 63 into the upper chamber 61 there is mounted upon tube 63, adjacent its lower end, an annular member 64 which is channel shaped in cross section and has disposed intermediate the upper and lower annular flanges thereof a ring 65 of gold or a ring which is at least gold coated. Any impurities tending to work downwardly along the outer surface of tube 63 toward the lower end of this tube will, before it reaches that end, be intercepted by the seal or bond between the ring 65 and the body of fluid metal in the reservoir 60. When such a protective element is employed it is easily possible to employ air as the gaseous medium above the body of mercury in the reservoir 60 without danger that any impurities developed on the surface of the mercury by reason of the presence of air may pass upwardly into the upper mercury reservoir 61. By the use of the seal, therefore, economy of operation of such a gauge will be realized.

In Figure 5 of the drawings lower and upper co-axial tubular members 70 and 71 are illustrated, the upper end of member 70 having an upwardly flaring frusto-conical seating surface to receive the outer surface of the downwardly tapering lower end of member 71 with as close a fit as is possible, the mutually engaging surfaces being ground as accurately as possible. The member 70 has an enlarged cup shaped portion or terminal end, as clearly shown, and retained in the channel like annular recess defined by the upper end of the lower member and the cylindrical surface of the upper member is a body of mercury which is intended to seal the joint between the mutually engaging ground surfaces of the members 70 and 71. Such a mercury seal is frequently used but it is not entirely effective since air and especially moisture will work downward between the mercury and the walls of the vessel, and thus reach the glass joint below. To prevent this a means is employed which includes an annular outer element 73 affixed to the inner surface of the enlarged upper end member 70, and an outwardly facing annular member indicated at 74 secured to the member 71. Members 73 and 74 are channel shaped in cross section and provided with surfaces or bands of gold, indicated at 73a and 74a respectively, and the seals which are formed between these gold bands and the body of mercury prevent, in the manner previously explained in connection with other embodiments of the invention, passage of surface impurities toward the joint between the interfacing frustoconical surfaces of members 70 and 71.

The method is likewise applicable to molten metals as well as to metals which are fluid at room temperature. For instance, a mold for forming ingots of molten steel or iron is diagrammatically illustrated in Figure 6. Metal reaches the mold chamber 80 only after having passed downwardly through the intake duct 80a. Encircling duct 80a and partially restricting the same is an annular metallic member 81, the melting point of which is higher than the melting point of the metal which is to be poured into the mold, and which ring 81 is also fabricated of a metal with which the incoming fluid metal may bond or by which the incoming metal may be "wetted." In the operation of casting with the aid of a mold of this type, a quantity of metal having no surface impurities is first poured into the duct 80a so that the ring 81 is immersed. Thereupon a bond is formed and a seal established and metal which is thereafter poured and which may have on its surface many surface impurities will, after having passed through the aperture in ring 81, be quite free of such surface impurities. The ring 81 will partially fuse and to prevent its too rapid wearing away it may be water cooled. A portion of a annular duct through which a cooling liquid such as water may be circulated is indicated at 80b.

In the appended claims the novel apparatus and method will be more particularly pointed out. It will be understood that where a receptacle is referred to, such receptacle need be of no particular shape or size and may be only a duct. The outlet port of the apparatus may be any aperture or conduit through which metal in a fluid state may pass. The seal recited comprises a bond between the fixed member and the body of fluid metal. Where the metal is fluid while cold, such as, for instance, when the metal is mercury, the sealing member is merely wetted by the mercury but where the metal is molten the sealing member may be partially fused. When partially fused, however, it may be said to be wetted.

Having thus described the invention, what is claimed as new and desired to be secured by Letters Patent is:

1. The method of removing surface impurities from a body of mercury free of internal contamination which comprises withdrawing mercury from said body in the form of a stream, passing the stream through a discharge port comprising a band formed essentially of gold and the exposed inner surface of which will be wetted by substantially pure mercury when brought into contact therewith, and interrupting such stream flow prior to the passage of the entire mercury body thereof through said band to maintain at said band a seal between the surface of the band and the mercury contacting the same and thus prevent the passage through said port of any impurities which may have been present upon the surface of the original body.

2. An apparatus for removing surface impurities from mercury which is otherwise uncontaminated, comprising a band formed essentially of gold and the exposed inner surface of which will be wetted by substantially pure mercury when brought into contact therewith, a vessel for receiving a body of mercury and directing it through said band in the form of a stream which makes continuous peripheral contact with said band in passing, means providing a channel for receiving the mercury passing through said band, and second means combined with said channel means for preventing the upper surface of the body of mercury being purified from falling below the level of said band and thus breaking the seal between mercury and band.

3. Apparatus for removing surface impurities from a body of mercury comprising, in combination, a chamber adapted to receive a body of mercury, an offtake duct through which mercury may escape from said chamber to a point of discharge said duct having a first portion of relatively large diameter and a second portion of smaller outside diameter projecting into said first portion and which defines, with said first portion, an annular well, and an annular member fabricated of a material which is wetted by mercury disposed in said well so as to make continuous surface contact with the mercury contained in said well and thus intercept any impurities upon the surface of the mercury flowing to the inlet port of the said second portion of said duct.

4. Apparatus for removing surface impurities from a body of mercury comprising, in combination, a chamber adapted to receive a body of mercury, an offtake duct through which mercury may escape from said chamber to a point of discharge said duct having a first portion of relatively large diameter and a second portion of smaller outside diameter projecting into said first portion and which defines, with said first portion, an annular well, and an annular member fabricated of a material which is wetted by mercury disposed in said well so as to make continuous surface contact with the mercury contained in said well and thus intercept any impurities upon the surface of the mercury flowing to the inlet port of the said second portion of said duct, a portion of said duct posterior to said second portion being disposed at an elevation higher than the inlet port of said second portion so that said member and inlet port are at all times covered by mercury.

5. The combination set forth in claim 4 in which valve means is positioned posterior to said second portion of the duct to control the flow therethrough.

6. Apparatus for removing surface impurities from a body of mercury comprising, in combination, a chamber adapted to receive a body of mercury, an offtake duct through which mercury may escape from said chamber to a point of discharge, the inlet port of said duct being located at the lower end of said chamber and a portion of the duct posterior to said port being disposed at an elevation higher than said inlet port so that a quantity of mercury remains therein at all times to form a seal, and a circular member fabricated of material which is wetted by mercury, said member being positioned to encircle the duct and to make continuous surface contact at all times with the sealing mercury contained within the seal holding portion of the duct.

7. Apparatus for removing surface impurities from a body of mercury comprising, in combination, a chamber adapted to receive a body of mercury, an offtake duct through which mercury may escape from said chamber to a point of discharge, the inlet port of said duct being located at the lower end of said chamber and a portion of the duct posterior to said port being disposed at an elevation higher than said inlet port so that a quantity of mercury remains therein at all times to form a seal, a circular member fabricated of material which is wetted by mercury and is positioned to encircle the duct and to make continuous surface contact at all times with the sealing mercury contained within the seal holding portion of the duct, and valve means for controlling the flow of mercury through said offtake duct, said valve means being positioned at a point along said duct posterior to the said circular member.

HENRY W. NIEMAN.
CHAUNCY W. NIEMAN.

REFERENCES CITED

The following references are of record in the file of this patent:

UNITED STATES PATENTS

| Number | Name | Date |
|---|---|---|
| 228,004 | Tunbridge | May 25, 1880 |
| 1,518,642 | Emmet | Dec. 9, 1924 |
| 1,820,141 | Jessup | Aug. 25, 1931 |
| 2,099,593 | Bender et al. | Nov. 16, 1937 |
| 2,126,596 | Wood | Aug. 9, 1938 |
| 2,274,658 | Booth | Mar. 3, 1942 |
| 2,307,835 | Gardiner | Jan. 12, 1943 |
| 2,375,232 | Hensel | May 8, 1945 |
| 2,436,375 | Booth et al. | Feb. 24, 1948 |